United States Patent
Okamoto

(10) Patent No.: US 12,301,772 B2
(45) Date of Patent: May 13, 2025

(54) INFORMATION PROCESSING DEVICE AND NON-TRANSITORY COMPUTER READABLE MEDIUM FOR ASSOCIATING INFORMATION WITH REGISTRATION METHOD

(71) Applicant: FUJIFILM BUSINESS INNOVATION CORP., Tokyo (JP)

(72) Inventor: Naoki Okamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 718 days.

(21) Appl. No.: 17/336,493

(22) Filed: Jun. 2, 2021

(65) Prior Publication Data

US 2022/0201130 A1 Jun. 23, 2022

(30) Foreign Application Priority Data

Dec. 17, 2020 (JP) ................. 2020-209597

(51) Int. Cl.
*H04N 1/00* (2006.01)
*H04L 29/08* (2006.01)
*H04L 67/1097* (2022.01)
*H04L 67/51* (2022.01)
*H04L 67/75* (2022.01)
*H04N 1/40* (2006.01)

(52) U.S. Cl.
CPC ....... *H04N 1/0044* (2013.01); *H04L 67/1097* (2013.01); *H04L 67/51* (2022.05); *H04L 67/75* (2022.05); *H04N 1/00806* (2013.01); *H04N 1/40062* (2013.01)

(58) Field of Classification Search
CPC ............. H04N 1/0044; H04N 1/00806; H04N 1/40062; H04L 67/1097; H04L 67/51; H04L 67/75; G06V 30/10; G06F 40/106; G06F 40/18
See application file for complete search history.

(56) References Cited

U.S. PATENT DOCUMENTS

2002/0163667 A1* 11/2002 Noda ................ G06K 15/00
358/1.15
2009/0153918 A1* 6/2009 Mori ................. H04N 1/00795
358/474

(Continued)

FOREIGN PATENT DOCUMENTS

JP H10-334182 A 12/1998
JP H11-120202 A 4/1999

(Continued)

OTHER PUBLICATIONS

Aug. 27, 2024 Office Action issued in Japanese Patent Application No. 2020-209597.

*Primary Examiner* — Iriana Cruz
(74) *Attorney, Agent, or Firm* — Oliff PLC

(57) ABSTRACT

An information processing device includes a processor configured to: receive a registration of information to be processed by a specific service from multiple registration methods; associate the received information with the registration method used to register the information; and cause the registration method associated with each of the information to be displayed on a list screen displaying a list of the received information.

14 Claims, 5 Drawing Sheets

(56) References Cited

U.S. PATENT DOCUMENTS

| | | | | |
|---|---|---|---|---|
| 2012/0105909 | A1* | 5/2012 | Kano | H04N 1/00244 |
| | | | | 358/1.15 |
| 2013/0150754 | A1* | 6/2013 | Rogers | A61B 7/04 |
| | | | | 600/586 |
| 2015/0301770 | A1* | 10/2015 | Hirata | G06F 3/1286 |
| | | | | 358/1.15 |
| 2019/0129583 | A1* | 5/2019 | Yamada | G06F 16/93 |
| 2019/0163422 | A1* | 5/2019 | Matsuo | G06F 3/1262 |
| 2021/0055903 | A1* | 2/2021 | Tanabe | H04N 1/0035 |
| 2021/0303895 | A1* | 9/2021 | Soga | H04N 1/00331 |
| 2022/0236934 | A1* | 7/2022 | Matsushima | G06F 3/126 |

FOREIGN PATENT DOCUMENTS

| | | |
|---|---|---|
| JP | 2013-025369 A | 2/2013 |
| JP | 2015-106844 A | 6/2015 |
| JP | 6088781 B2 | 3/2017 |

\* cited by examiner

INFORMATION PROCESSING DEVICE AND NON-TRANSITORY COMPUTER READABLE MEDIUM FOR ASSOCIATING INFORMATION WITH REGISTRATION METHOD

CROSS-REFERENCE TO RELATED APPLICATIONS

This application is based on and claims priority under 35 USC 119 from Japanese Patent Application No. 2020-209597 filed Dec. 17, 2020.

BACKGROUND

(i) Technical Field

The present disclosure relates to an information processing device and a non-transitory computer readable medium.

(ii) Related Art

Japanese Patent No. 6088781 describes a technology capable of presenting candidates for tags to be applied to image data, without using a judgment of image similarity.

SUMMARY

Here, in a service that receives a registration of information from multiple registration methods, the registration method used in the registration of information may be useful metadata for certain purposes, such as helping the user to remember the information and also searching for specific information from among a variety of different information, for example.

Aspects of non-limiting embodiments of the present disclosure relate to, in the case of receiving a registration of information from multiple registration methods, causing the user to recognize the registration method used to register each piece of information from a list screen that lists the received information.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to: receive a registration of information to be processed by a specific service from multiple registration methods; associate the received information with the registration method used to register the information; and cause the registration method associated with each of the information to be displayed on a list screen displaying a list of the received information.

BRIEF DESCRIPTION OF THE DRAWINGS

Exemplary embodiments of the present disclosure will be described in detail based on the following figures, wherein.

DETAILED DESCRIPTION (First Exemplary Embodiment)

Figure 1:
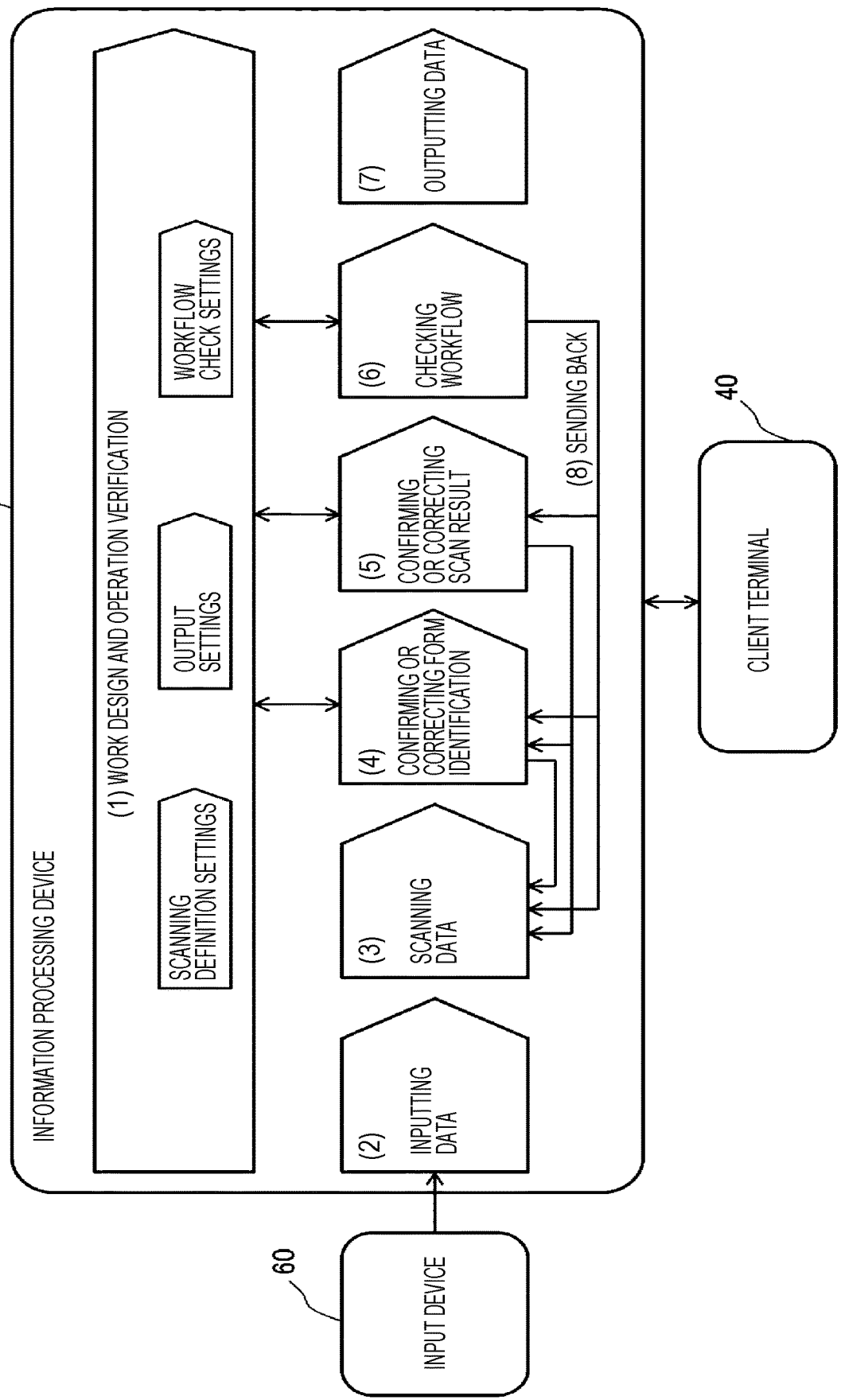
FIG. 1 is a diagram illustrating a schematic configuration of a form system.

Hereinafter, a form system 10 according to an exemplary embodiment will be described. FIG. 1 is a diagram illustrating a schematic configuration of the form system 10 according to the exemplary embodiment.

As illustrated in FIG. 1, the form system 10 includes an information processing device 20, a client terminal 40, and an input device 60. These devices are connected to a network not illustrated, and are capable of communicating with each other over the network. The Internet, a local area network (LAN), or a wide area network (WAN) is applied as the above network, for example.

The information processing device 20 manages the flow of a series of process that includes performing an optical character recognition (OCR) process on the image data of a multi-page document containing a form, the image data being inputted through the input device 60, and outputting the result of the OCR process to a predetermined destination. A specific configuration and action of the information processing device 20 will be described later.

The client terminal 40 transmits various instructions related to the OCR process to the information processing device 20. For example, the various instructions include an instruction for starting a scan of information in the image data and an instruction for displaying a result of scanning information in the image data. Also, the client terminal 40 displays various information, such as the result of the OCR process performed by the information processing device 20 according to various received instructions, and notifications related to the OCR process. For the client terminal 40, a server computer or a general-purpose computer device such as a personal computer (PC) is applied, for example. In FIG. 1, only a single client terminal 40 is illustrated, but the configuration is not limited thereto. Multiple client terminals 40 may also be prepared, and different client terminals 40 may be used for different processes, for example.

The input device 60 inputs image data to be subjected to the OCR process into the information processing device 20. For the input device 60, a server computer, a general-purpose computer device such as a PC, or an image forming device including functions such as a scanner function, a printer function, and a fax machine function is applied, for example. Note that image data may also be inputtable into the information processing device 20 from the client terminal 40 in addition to the input device 60.

Next, an overview of the form system 10 will be described. The form system 10 is a system in which the information processing device 20 performs the OCR process on image data inputted through the input device 60, and outputs the result of the OCR process to a predetermined destination.

In the OCR process, the information processing device 20 manages the various processes of (1) workflow design and operation verification, (2) inputting data, (3) scanning data, (4) confirming or correcting the form identification, (5) confirming or correcting the scan result, (6) checking the workflow, (7) outputting data, and (8) sending back. In the exemplary embodiment, the OCR process is used to refer to not only the process of simply reading information such as characters and symbols from image data, but also post-processing such as character correction.

As an example of managing the various processes, the processes of (1) workflow design and operation verification, (2) inputting data, (3) scanning data, (6) checking the workflow, and (7) outputting data are each executed by the information processing device 20 automatically. Also, as an example of managing the various processes, the processes of (4) confirming or correcting the form identification and (5) confirming or correcting the scan result are each received by input from the user through the client terminal 40. Also, as an example of managing the various processes, the process of (8) sending back may be executed by the information processing device 20 automatically in some cases, and may also be received by input from the user through the client terminal 40 in some cases.

In the process of (1) workflow design and operation verification, job rules including scanning definition settings, output settings, and workflow check settings are created. In the scanning definition settings, scanning ranges prescribing ranges from which to read information in the image data in the process of "(3) scanning data" are set, for example. As a more specific example, a definition may be set so as to read a field value existing as a nearby value to the right of a field extracted as a key. In the output settings, the file format and destination of the output data to be output in the process of "(7) outputting data" are set, for example. In the workflow check settings, format settings such as required input fields and the number of inputtable characters in the form to be detected in the process of "(6) checking the workflow" are set, for example.

In the process of (2) inputting data, image data is received from the input device 60 as input. The image data received as input is registered as a job, which is the unit of execution in the process of "(3) scanning data".

In the process of (3) scanning data, job rules for the job to be executed which are selected by the user from among job rules created in the process of "(1) workflow design and operation verification" are used to read information in the image data of the job. For example, in this process, a process of identifying the form included in the image data in the job (hereinafter referred to as "form identification") and a process of reading characters and symbols inside the scanning ranges are performed.

In the process of (4) confirming or correcting the form identification, the image data in the job is divided into records indicating the form included in the job, on the basis of the result of the form identification performed in the process of "(3) scanning data". Thereafter, in this process, the divided records are displayed, and a confirmation or correction of the form identification is received from the user.

In the process of (5) confirming or correcting the scan result, the result of scanning characters and symbols inside the scanning ranges performed in the process of "(3) scanning data" is displayed, and a confirmation or correction of the scan result is received from the user.

In the process of (6) checking the workflow, errors in each of the preceding processes are detected according to the workflow check settings included in the job rules for the job that were selected by the user from among the job rules created in the process of "(1) workflow design and operation verification". The detection result may also be presented to the user.

In the process of (7) outputting data, output data is created using the output settings included in the job rules for the job that were selected by the user from among the job rules created in the process of "(1) workflow design and operation verification", and the created output data is output to a predetermined destination.

In the process of (8) sending back, a process executed in the OCR process is sent back one or multiple stages. As an example, an instruction for sending back is given by the user from the client terminal 40 during the execution of the various processes such as "(4) confirming or correcting the form identification" and "(5) confirming or correcting the scan result". As another example, an instruction for sending back is given from the client terminal 40 of an administrator according to the result of a check by the administrator performed between the processes of "(6) checking the workflow" and "(7) outputting data".

In the above OCR process, the process of "(1) workflow design and operation verification" is executed before the processes from "(3) scanning data" onward are performed, or in other words, before the form system 10 is put into operation. Furthermore, the process of "(1) workflow design and operation verification" may also be executed during the operation of the form system 10 in which the processes from "(3) scanning data" onward are being performed. As an example, the job rules created in the process of "(1) workflow design and operation verification" before the form system 10 is put into operation may be corrected appropriately according to the result of the process of "(5) confirming or correcting the scan result" while the form system 10 is in operation.

Figure 2:
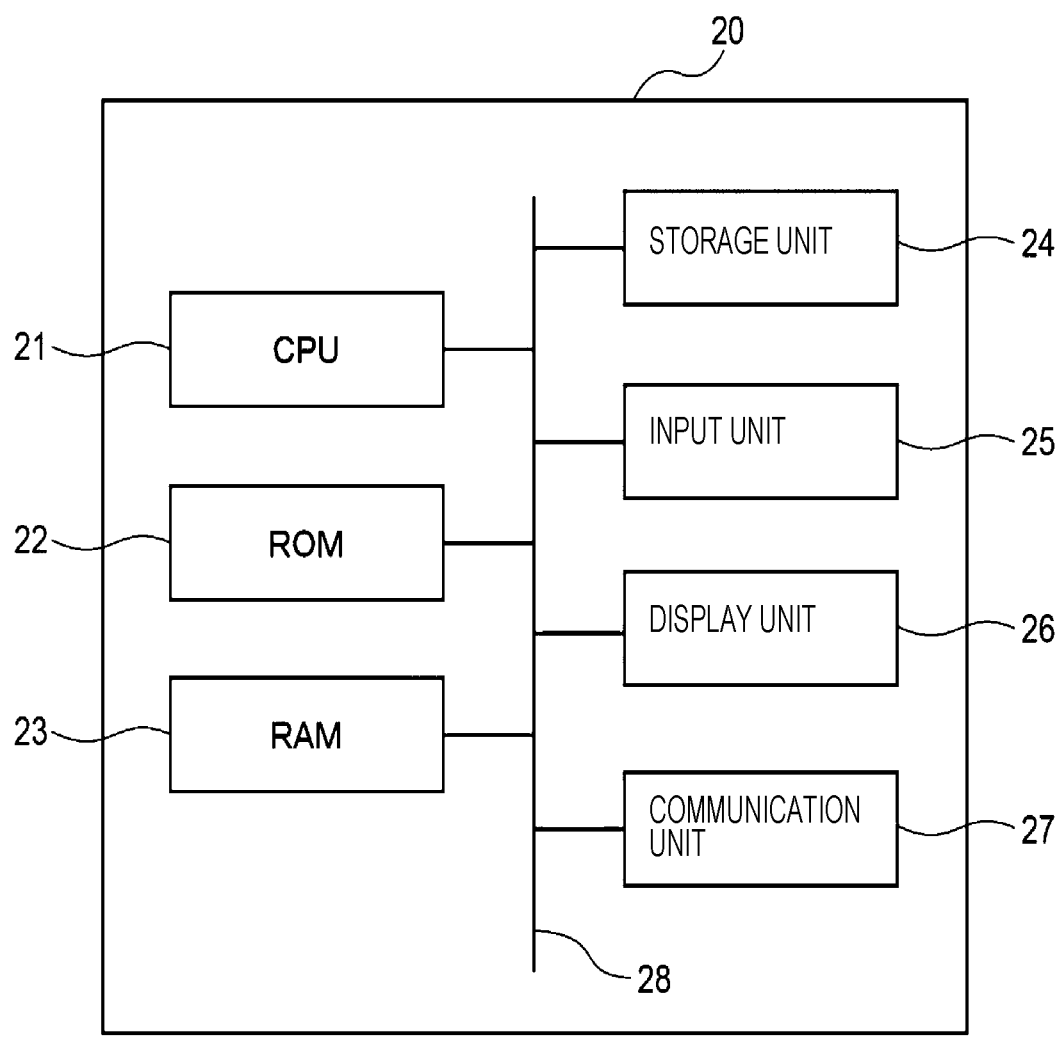
FIG. 2 is a block diagram illustrating a hardware configuration of an information processing device.

FIG. 2 is a block diagram illustrating a hardware configuration of the information processing device 20. For the information processing device 20, a server computer or a general-purpose computer device such as a PC is applied, for example.

As illustrated in FIG. 2, the information processing device 20 is provided with a central processing unit (CPU) 21, read-only memory (ROM) 22, random access memory (RAM) 23, a storage unit 24, an input unit 25, a display unit 26, and a communication unit 27. These components are communicably interconnected through a bus 28. The CPU 21 is one example of a "processor".

The CPU 21 is a central processing unit that executes various programs and controls each unit. In other words, the CPU 21 reads out a program from the ROM 22 or the storage unit 24, and executes the program while using the RAM 23 as a work area. The CPU 21 controls each unit described above and performs various arithmetic processing in accordance with the program stored in the ROM 22 or the storage unit 24. In the exemplary embodiment, an information processing program for executing at least a registration process and a display process described later is stored in the ROM 22 or the storage unit 24. Note that the information processing program may be preinstalled in the information processing device 20, or the information processing program may be stored in a non-volatile storage medium or distributed over a network and installed in the information processing device 20 appropriately. Anticipated examples of the non-volatile storage medium include a CD-ROM, a magneto-optical disc, a hard disk drive (HDD), a DVD-ROM, flash memory, or a memory card.

The ROM 22 stores various programs and various data. The RAM 23 temporarily stores programs or data as a work area.

The storage unit 24 includes a storage device such as an HDD, a solid-state drive (SSD), or flash memory, and stores various programs, including an operating system, and various data.

The input unit 25 includes a pointing device such as a mouse and a keyboard, and is used to input various information.

The display unit 26 is a liquid crystal display, for example, and displays various information. The display unit 26 may also adopt touch panel technology and function as the input unit 25.

The communication unit 27 is an interface for communicating with other equipment such as the client terminal 40. The communication is achieved by using a wired communication standard such as Ethernet® or FDDI, or a wireless communication standard such as 4G, 5G, or Wi-Fi®, for example.

When executing the information processing program described above, the information processing device 20 uses the hardware resources described above to execute a process based on the information processing program.

Figure 3:
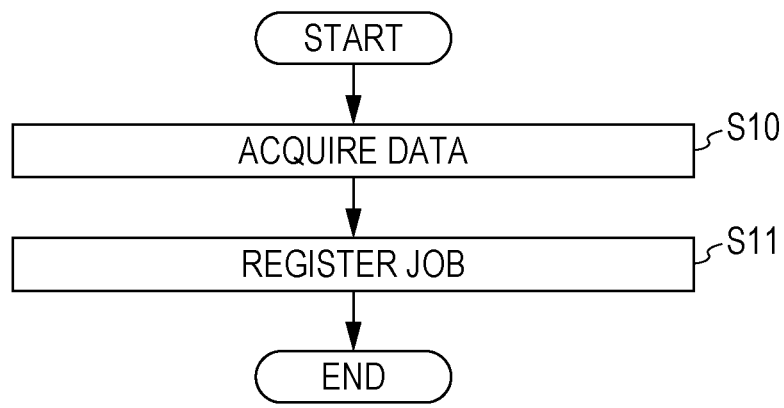
FIG. 3 is a flowchart illustrating the flow of a registration process by the information processing device.

FIG. 3 is a flowchart illustrating the flow of a registration process in which image data received as input from the input device 60 by the information processing device 20 is registered as a job. The registration process is performed by having the CPU 21 read out the information processing program from the ROM 22 or the storage unit 24, load the information processing program into the RAM 23, and execute the information processing program.

In step S10 illustrated in FIG. 3, the CPU 21 acquires data inputted using a registration method of the input device 60. Subsequently, the flow proceeds to step S11.

As an example, the data inputted using the registration method includes image data of multiple pages of documents including forms, the registration method used to input the image into the information processing device 20, job rules to use for the job after the image data is registered as a job, and a registration contact person who inputted the image data.

Here, a form is a record used as evidence, and includes both "ledgers", which are documents for ascertaining the financial condition of an enterprise, and "vouchers", which are documents produced every time an ordinary transaction occurs. For ledgers, the types of forms may include "Journal", "General Ledger", "Cash Account", "Deposit Account", "Accounts Payable", "Accounts Receivable", "Expense Book", and "Fixed Asset Ledger". For vouchers, the types of forms may include "Deposit/Withdrawal Slip", "Quotation", "Invoice", "Purchase Order", "Statement of Delivery", and "Receipt".

Examples of the registration method include a local folder, cloud storage, facsimile (fax), scanning, a hot folder, and an application programming interface (API).

For example, image data is inputted into the information processing device 20 using a local folder by having a user select any data from among data stored in a local folder of a computer device that acts as the input device 60.

As another example, image data is inputted into the information processing device 20 using cloud storage by having a user select any data from among data stored in the cloud storage of a computer device that acts as the input device 60.

As another example, image data is inputted into the information processing device 20 using facsimile by transmitting the image data of multiple pages of documents including forms using a fax function of an image forming device that acts as the input device 60.

As another example, image data is inputted into the information processing device 20 using scanning by transmitting the image data of multiple pages of documents including forms using a scan function of an image forming device that acts as the input device 60.

As another example, image data is inputted into the information processing device 20 using a hot folder by monitoring a hot folder of a computer device that acts as the input device 60, and in a case where predetermined data is stored in the hot folder, having the computer device transmit the stored data automatically.

As another example, image data is inputted into the information processing device 20 using an API provided by the form system 10 by having a user select any data from among data stored in a local folder of a computer device that acts as the input device 60, and transmitting the data through the API.

In step S11, the CPU 21 registers the image data received as input in step S10 as a job. Thereafter, the process ends. Also, when registering a job, the CPU 21 causes the storage unit 24 to store the job in association with the registration method used to input the image data included in the job, job rules to use for the job, and a registration contact person who inputted the image data.

Figure 4:
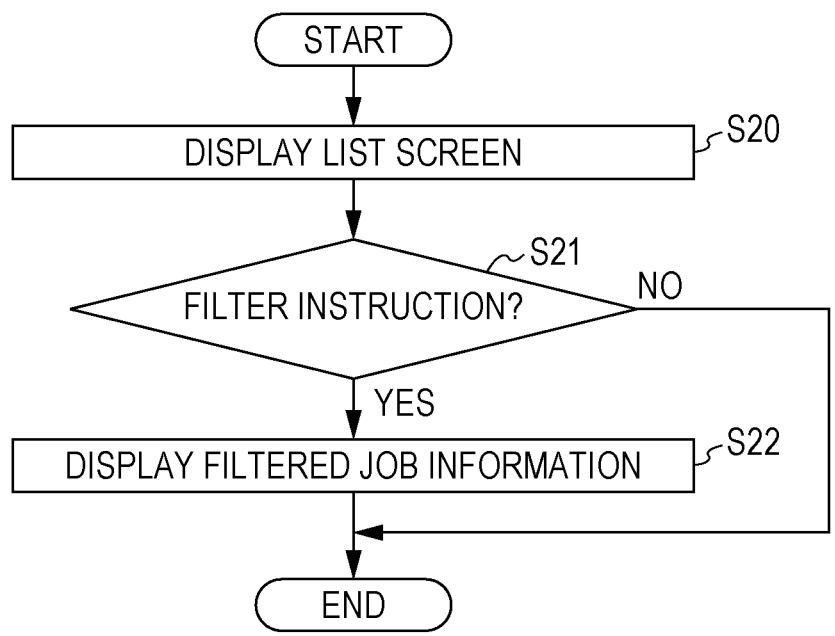
FIG. 4 is a flowchart illustrating the flow of a display process by the information processing device.

FIG. 4 is a flowchart illustrating the flow of a display process that causes a list screen 45 of jobs received by the information processing device 20 to be displayed. The display process is performed by having the CPU 21 read out the information processing program from the ROM 22 or the storage unit 24, load the information processing program into the RAM 23, and execute the information processing program.

In step S20 illustrated in FIG. 4, the CPU 21 causes the client terminal 40 to display the list screen 45 of received jobs. Subsequently, the flow proceeds to step S21.

As an example, the list screen 45 is displayed in response to a mouse operation performed by the user. Specifically, the list screen 45 is displayed when a predetermined icon not illustrated for displaying the list screen 45 is selected by left-clicking on a screen of the client terminal 40.

Figure 5:
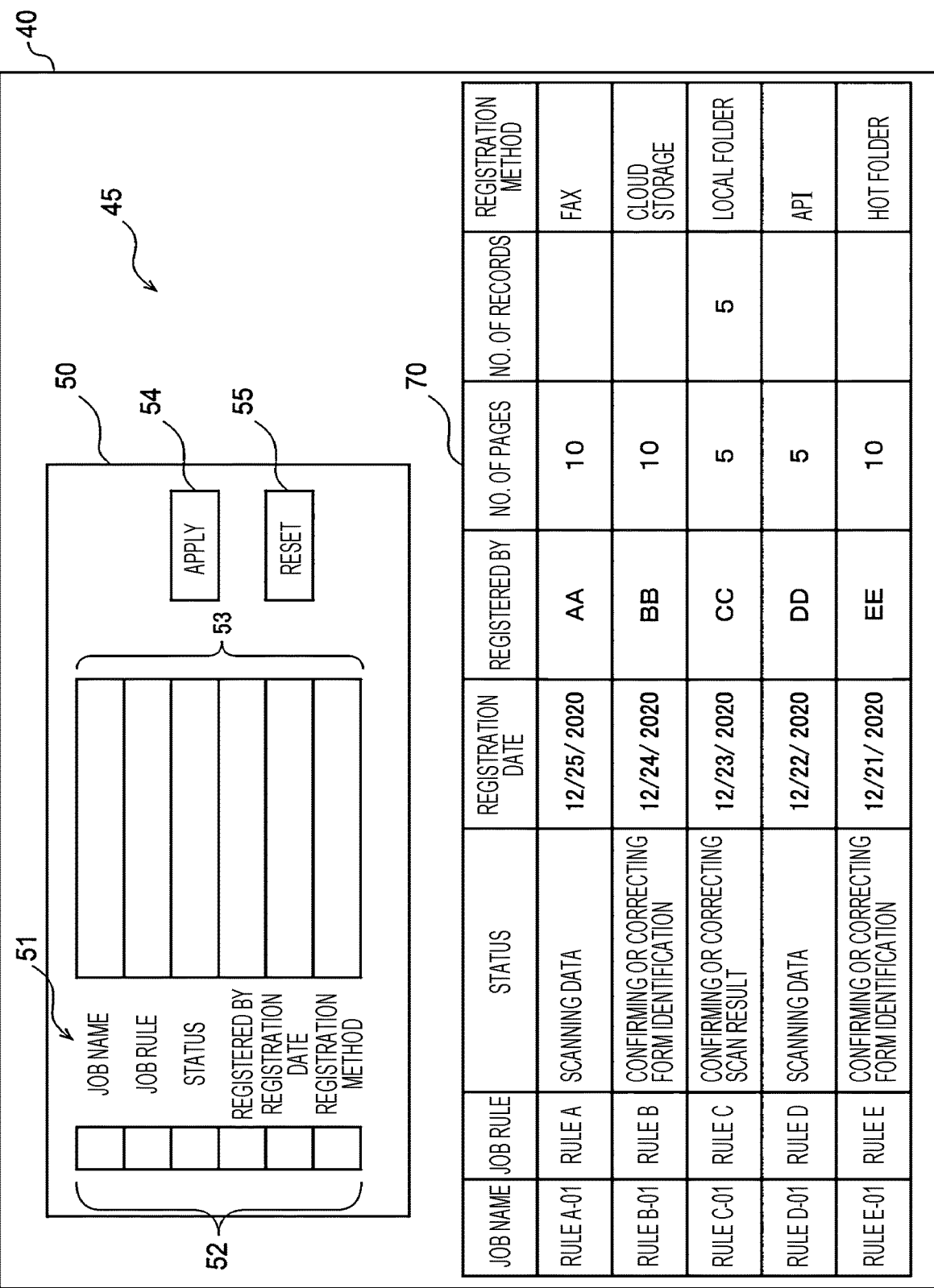
FIG. 5 is a first display example of a list screen displayed on the screen of the client terminal.

FIG. 5 is a first display example of the list screen 45 displayed on the screen of the client terminal 40. As illustrated in FIG. 5, a filter information area 50 and a job information area 70 are displayed on the list screen 45.

The filter information area 50 is a user interface for filtering the list of jobs displayed in the job information area 70 so that one or more designated jobs are displayed. In the filter information area 50, keywords 51, checkboxes 52, input fields 53, an Apply button 54, and a Reset button 55 are displayed.

Multiple filter keywords that may be designated when filtering the list of jobs displayed in the job information area 70 are displayed as the keywords 51. As an example, a keyword 51 displayed to the right of a checkbox 52 marked with a check mark is designated as a filter keyword (see FIG. 6).

Filter conditions corresponding to each keyword 51 are inputtable into the input fields 53. As an example, in the case where the filter keyword designated as the keyword 51 is "registration method", at least one of local folder, cloud storage, fax, scan, hot folder, and API is inputtable into the input field 53. Note that in the case where a filter condition is inputted into one of the input fields 53 before a filter keyword is designated, the CPU 21 may put a check mark into the checkbox 52 corresponding to the input field 53 where the filter condition is inputted.

The Apply button 54 is a button for applying the filter condition(s) inputted into the input fields 53 to the job information area 70.

The Reset button 55 is a button for resetting the list of jobs displayed in the job information area 70 to an initial state. As an example, in the initial state, the list of jobs is displayed by registration date in descending order, or in other words in order of most recent date, like the job information area 70 illustrated in FIG. 5.

In the job information area 70, each job and multiple fields related to the corresponding job are displayed on individual rows as the list of jobs. The multiple fields include the job name, the job rule, the status, the registration date, the registration contact person, the number of pages, the number of records, and the registration method of each job.

In the job name field, a name obtained by adding a serial number for each job to the name of the job rule used for each job is displayed. As an example, the CPU 21 causes "Rule A-01" obtained by adding the serial number "-01" to the name of the job rule (for example, Rule A) of the job on the uppermost row illustrated in FIG. 5 (hereinafter referred to as the "first job") to be displayed as the job name of the first job.

In the job rule field, the name of the job rule used for each job included in the data inputted using the registration method is displayed. As an example, the CPU 21 causes "Rule A", which is the name of the job rule associated with the first job acquired from the storage unit 24, to be displayed in the job rule field of the first job illustrated in FIG. 5.

In the status field, the progress of the OCR process for each job is displayed. As an example, the case where "scan data" is displayed in the status field indicates that the process of "(3) scanning data" in the OCR process is being performed for the job for which the status is displayed. As an example, the CPU 21 causes "scan data" acquired as the progress of the OCR process for the first job to be displayed as the status of the first job illustrated in FIG. 5.

In the registration date field, the date when image data inputted using a registration method was registered as a job is displayed. As an example, the CPU 21 causes the date when the first job was registered, namely "12/25/2020", to be displayed in the registration date of the first job illustrated in FIG. 5.

In the registered by field, the name of the registration contact person included in the data inputted using the registration method is displayed. As an example, the CPU 21 causes the name "AA" of the registration contact person associated with the first job acquired from the storage unit 24 to be displayed in the registered by field of the first job illustrated in FIG. 5.

In the number of pages field, the number of document pages included in the image data inputted using the registration method is displayed. As an example, the CPU 21 causes "10", the number of document pages acquired as the scan result of "(2) inputting data" of the first job to be displayed as the number of pages in the first job illustrated in FIG. 5.

In the number of records field, the number of records obtained after dividing the image data of the multiple document displayed in the number of pages field into records expressing the forms included in the job is displayed. Note that in the OCR process, the division into records ends after the process of "(4) confirming or correcting the form identification", and therefore the number of records is displayed for jobs in which a process subsequent to "(4) confirming or correcting the form identification", such as "confirming or correcting scan result" or "checking work", is displayed in the status field. As an example, the corresponding status of the first job illustrated in FIG. 5 is "scanning data", and therefore the CPU 21 does not cause a numerical value to be displayed in the number of records field.

Here, in the first exemplary embodiment, image data received as input from the input device 60 is registered as a job, and even after the image data in the job is divided into records, information associating the records with the corresponding job and the registration method used to input the image data included in the job is stored in the storage unit 24.

In the registration method field, the name of the registration method included in the data inputted using the registration method is displayed. As an example, the CPU 21 causes the name "fax" of the registration method associated with the first job acquired from the storage unit 24 to be displayed in the registration method field of the first job illustrated in FIG. 5.

Returning to FIG. 4, in step S21, the CPU 21 determines whether or not a filter instruction with respect to the list screen 45 has been received, and in the case where a filter instruction has been received (step S21: YES), the flow proceeds to step S22. On the other hand, in the case where the CPU 21 determines that a filter instruction has not been received (step S21: NO), the process ends.

As an example, in the case where the Apply button 54 is operated after inputting one or more filter conditions into the input fields 53, the CPU 21 determines that a filter instruction is received in step S21. The filter instruction is one example of an "instruction".

In step S22, the CPU 21 causes the job information area 70 obtained after executing the received filter instruction to be displayed on the list screen 45. Thereafter, the process ends.

Figure 6:
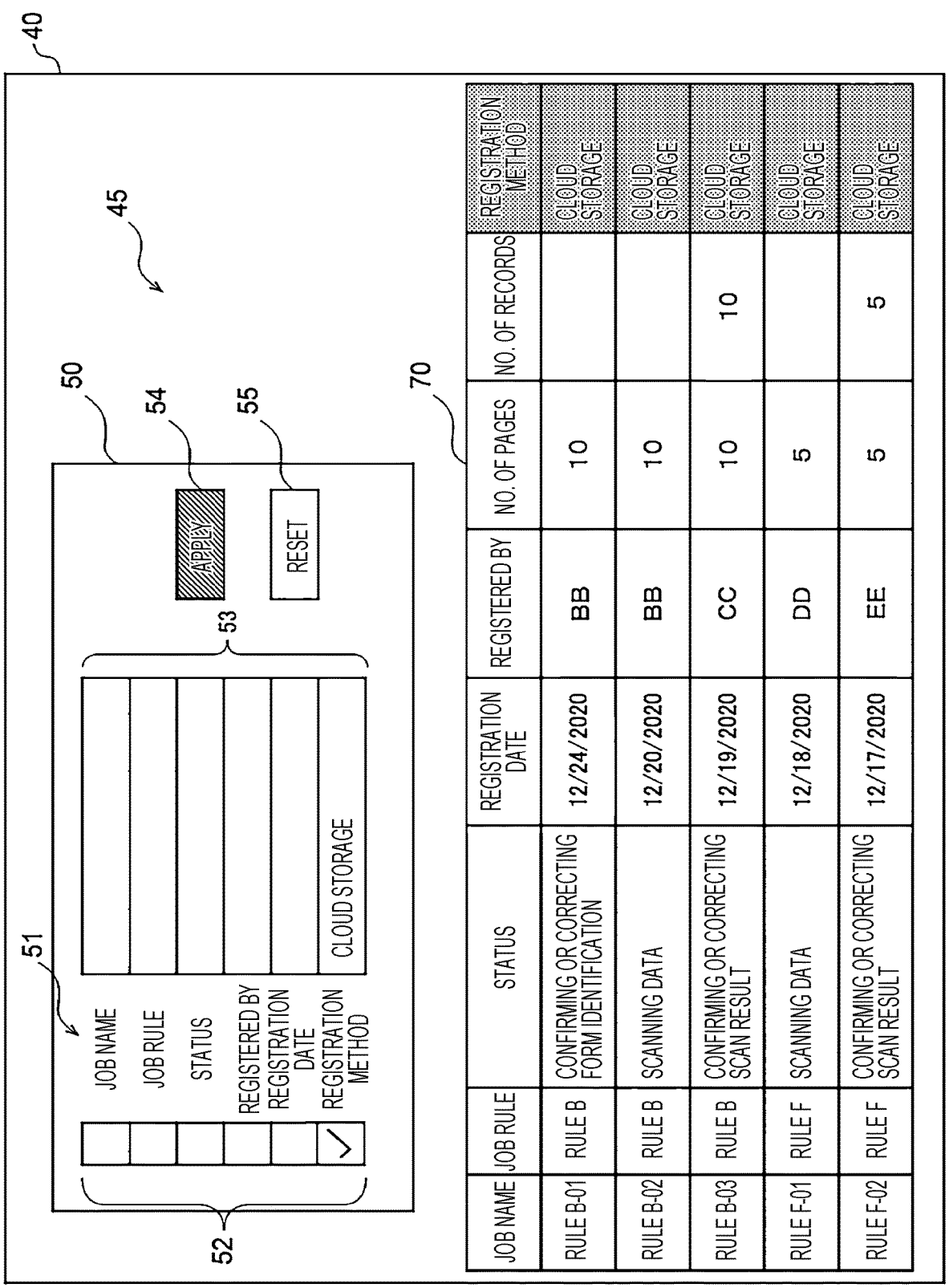
FIG. 6 is a second display example of a list screen displayed on the screen of the client terminal.

FIG. 6 is a second display example of the list screen 45 displayed on the screen of the client terminal 40. The display example illustrated in FIG. 6 illustrates a state after the display content of the job information area 70 has been filtered using a filter condition inputted into the input fields 53.

In the filter information area 50 illustrated in FIG. 6, the filter keyword designated as a keyword 51 is "registration method, and "cloud storage" is inputted into the input field 53 corresponding to the registration method keyword. Also, in FIG. 6, the frame representing the Apply button 54 is shaded to indicate that the Apply button 54 has been operated.

In other words, in the display example illustrated in FIG. 6, the CPU 21 receives a filter instruction to filter the list of jobs displayed in the job information area 70 of the list screen 45 such that jobs registered using cloud storage designated from among the multiple registration methods are displayed. With this arrangement, in the job information area 70 illustrated in FIG. 6, jobs registered using cloud storage designated as the filter condition are displayed by registration date in descending order.

With the above configuration, according to the first exemplary embodiment, a list of jobs filtered by registration method is displayed on the list screen 45. Also, according to the first exemplary embodiment, because it is possible to filter jobs using the registration method as a filter keyword, the number of possible filter variations is expanded and it is anticipated that the user will be able to find an intended job easily compared to a configuration that does not provide the ability to filter by registration method.

Also, in the first exemplary embodiment, in the case of receiving a filter instruction using a registration method designated from among multiple registration methods, the CPU 21 causes the registration method field and the fields other than the registration method field among the multiple fields displayed in the job information area 70 of the list screen 45 to be displayed with a different appearance. As an example, in the display example illustrated in FIG. 6, among the multiple fields displayed in the job information area 70, the CPU 21 causes the frames of the registration method designated as the filter keyword in the keywords 51 to be displayed with a color applied, and causes the fields other than the registration method field to be displayed without a color applied. Consequently, according to the first exemplary embodiment, the visibility of the registration method field displayed in the job information area 70 is increased compared to a configuration in which the registration method designated as the filter keyword described above and the fields other than the registration method field are displayed with a common appearance.

Here, in a service that receives the input of data such as the image data of multiple pages of documents including forms from multiple registration methods, the registration method used to input the data may be useful metadata for certain purposes, such as helping the user to remember the data and also searching for specific data from among a variety of different data, for example.

Accordingly, in the first exemplary embodiment, the CPU 21 receives the registration of jobs to be processed by the form system 10 from multiple registration methods, and associates each received job with the registration method used to register the job. Thereafter, the CPU 21 causes the registration method associated with each of the jobs to be displayed on the list screen 45 displaying a list of the received jobs. The form system 10 is one example of a "specific service", and a job is one example of "information".

As an example, in the display example illustrated in FIG. 5, "fax", "cloud storage", "local folder", "API", and "hot folder" are displayed in order from the uppermost row of the registration method field as the registration methods associated with each of the five jobs displayed in the job information area 70 of the list screen 45.

With the above configuration, according to the first exemplary embodiment, in the case of receiving the registration of jobs from multiple registration methods, it is possible to make the user recognize the registration method used to register each job from the list screen 45 of received jobs. Also, according to the first exemplary embodiment, among information such as "when", "where", and "who" that is utilized to help a person remember something, the registration method which corresponds to "where" is displayed on the list screen 45, and consequently it is anticipated that the user will be able to recognize a displayed job easily.

(Second Exemplary Embodiment)

Next, a second exemplary embodiment will be described while omitting or simplifying portions that overlap with other exemplary embodiments.

Like the first exemplary embodiment, in the second exemplary embodiment, the CPU 21 performs an OCR process in the form system 10, but in the OCR process, the CPU 21 performs a process corresponding to the registration method used to register a job. In other words, according to the second exemplary embodiment, the content of the OCR process is changed according to the registration method used to register a job. The OCR process is one example of a "specific process".

Hereinafter, a specific example of a process corresponding to the registration method used to register a job as above will be described. As an example, in the case where the registration method used to register a job is cloud storage, the CPU 21 adds storage information indicating the storage location of the forms included in the job in cloud storage to the output data that is output in the process of "(7) outputting data" in the OCR process. The output data is one example of "output information".

For example, the storage information is a Uniform Resource Locator (URL) indicating the storage location of the data of the forms in cloud storage. In the second exemplary embodiment, by having the CPU 21 add storage information to the output data, the storage information is displayed in the upper-right corner of the outputted output data, for example.

With the above configuration, according to the second exemplary embodiment, the user is made to recognize the storage location of the forms included in a job in cloud storage.

As an example, in the case where fax is the registration method used to register a job and the forms included in the job are transmitted using the fax function of an image forming device that acts as the input device 60, the CPU 21 performs a process of correcting the images of the forms included in the job in the OCR process. In the second exemplary embodiment, the CPU 21 performs the above process of correcting the images of the forms between the processes of "(2) inputting data" and "(3) scanning data", for example. In the above process of correcting the images of the forms, image correction such as tilt correction and noise removal is performed, for example.

With the above configuration, according to the second exemplary embodiment, the images of forms transmitted using a fax function are corrected in the OCR process.

As an example, in the case where a job is registered through an API provided by the form system 10, the CPU 21 skips processes executed when a job is registered using a registration method other than the API in the OCR process. In the second exemplary embodiment, the processes executed when a job is registered using a registration method other than the API are "(1) workflow design and operation verification", "(4) confirming or correcting the form identification", "(5) confirming or correcting the scan result", "(6) checking the workflow", and "(8) sending back", for example. In other words, in the case where a job is registered through the API, only the processes of "(2) inputting data", "(3) scanning data", and "(7) outputting data" are performed in the OCR process.

With the above configuration, according to the second exemplary embodiment, the OCR process is made to end sooner compared to a configuration that performs similar processes in the OCR process regardless of the type of registration method used to register a job.

(Other)

In the foregoing exemplary embodiments, job rules are created by the process of "(1) workflow design and operation verification", but a job rule set combining multiple job rules may be created additionally in the process of "(1) workflow design and operation verification". In the case where a job rule set is created, the job rule set may be included in the data inputted using the registration method. In contrast, in the case where a job rule set is not created, job rules and a job rule set do not have to be included in the data inputted using the registration method.

In the foregoing exemplary embodiments, the registration date is displayed in the job information area 70, but a registration date and time may be displayed instead.

In the foregoing exemplary embodiments, the CPU 21 causes the frames of the registration method designated from among multiple registration methods to be displayed with a color applied as a way of causing the registration method field and the fields other than the registration method field among the multiple fields displayed in the job information area 70 of the list screen 45 to be displayed with a different appearance. However, the "different appearance" described above is not limited to the above example, and may also be achieved by applying a color to the characters indicating the registration method, changing the dimensions or the font of the characters indicating the registration method, or the like. Furthermore, in the case of applying a color to the characters indicating the registration method, different colors may be applied to different types of registration methods.

In the foregoing exemplary embodiments, the CPU 21 may also prohibit the registration of a job by one or more predetermined registration methods among the multiple registration methods. In other words, the CPU 21 may allow the registration of a job only through one or more predetermined registration methods among the multiple registration methods.

As an example, from among the multiple registration methods, the CPU 21 may prohibit the registration of a job using a local folder. As another example, from among the multiple registration methods, the CPU 21 may allow the registration of jobs only from the fax function of an image forming device that acts as the input device 60. In this case, multiple image forming devices acting as the input device 60 exist, and the CPU 21 is capable of receiving the registration of jobs to be processed by the form system 10 from multiple registration methods.

Note that each of the foregoing exemplary embodiments and the content described in the (Other) section may be combined appropriately.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
receive a registration of information from a plurality of registration methods;
associate the received information with the registration method used to register the information; and
cause the registration method associated with each of the information to be displayed on a list screen displaying a list of the received information, wherein the processor is further configured to:
receive, on the list screen, a user operation to designate one of the plurality of registration methods; and
cause the list of the information displayed on the list screen to be filtered such that information registered using the designated registration method is displayed.

2. The information processing device according to claim 1, wherein
on the list screen, a plurality of fields related to the information and including a field indicating the registration method associated with the information are displayed as the list of the information, and
in a case of receiving the instruction using a registration method designated from among the plurality of registration methods, the processor is configured to cause the registration method field and the fields other than the registration method field among the plurality of fields displayed on the list screen to be displayed with a different appearance.

3. The information processing device according to claim 1, wherein
in a specific service, the processor is configured to perform a specific process including a process of scanning a form in which information has been written or inputted into predetermined fields, and
in the specific process, the processor is configured to perform a process corresponding to the registration method used to register the information.

4. The information processing device according to claim 2, wherein
in a specific service, the processor is configured to perform a specific process including a process of scanning a form in which information has been written or inputted into predetermined fields, and
in the specific process, the processor is configured to perform a process corresponding to the registration method used to register the information.

5. The information processing device according to claim 3, wherein
in a case where the registration method used to register the information is cloud storage, the processor is configured to add storage information indicating a storage location of the form included in the information in the cloud storage to output information to be outputted in the specific process.

6. The information processing device according to claim 4, wherein
in a case where the registration method used to register the information is cloud storage, the processor is configured to add storage information indicating a storage location of the form included in the information in the cloud storage to output information to be outputted in the specific process.

7. The information processing device according to claim 3, wherein
in a case where the registration method used to register the information is a fax function provided in an image forming device, and the form included in the information is transmitted using the fax function, in the specific process, the processor is configured to perform a process of correcting an image of the form included in the information.

8. The information processing device according to claim 4, wherein in a case where the registration method used to register the information is a fax function provided in an image forming device, and the form included in the information is transmitted using the fax function, in the specific process, the processor is configured to perform a process of correcting an image of the form included in the information.

9. The information processing device according to claim 5, wherein in a case where the registration method used to register the information is a fax function provided in an image forming device, and the form included in the information is transmitted using the fax function, in the specific process, the processor is configured to perform a process of correcting an image of the form included in the information.

10. The information processing device according to claim 6, wherein in a case where the registration method used to register the information is a fax function provided in an image forming device, and the form included in the information is transmitted using the fax function, in the specific process, the processor is configured to perform a process of correcting an image of the form included in the information.

11. The information processing device according to claim 3, wherein in a case where the information is registered through an API provided by the specific service and treated as the registration method, in the specific process, the processor is configured to skip a process executed when the information is registered using a registration method other than the API.

12. The information processing device according to claim 4, wherein in a case where the information is registered through an API provided by the specific service and treated as the registration method, in the specific process, the processor is configured to skip a process executed when the information is registered using a registration method other than the API.

13. The information processing device according to claim 5, wherein in a case where the information is registered through an API provided by the specific service and treated as the registration method, in the specific process, the processor is configured to skip a process executed when the information is registered using a registration method other than the API.

14. A non-transitory computer readable medium storing a program causing a computer to execute a process for processing information, the process comprising:

receiving a registration of information from a plurality of registration methods;

associating the received information with the registration method used to register the information;

causing the registration method associated with each of the information to be displayed on a list screen displaying a list of the received information;

receiving, on the list screen, a user operation to designate one of the plurality of registration methods; and causing the list of the information displayed on the list screen to be filtered such that information registered using the designated registration method is displayed.

* * * * *